(12) United States Patent
Beck et al.

(10) Patent No.: US 7,679,636 B1
(45) Date of Patent: Mar. 16, 2010

(54) APPARATUS AND METHOD FOR ROUTING TELECOMMUNICATION CALLS USING VISUAL CALLER INFORMATION

(75) Inventors: Alexander John Gray Beck, Frenchs Forest (AU); Jonathan R. Yee-Hang Choy, Wahroonga (AU); Nevill John Inglis, Castle Hill (AU); Alexander Martin Scholte, Phegans Bay (AU); David Preshan Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 1219 days.

(21) Appl. No.: 11/225,367

(22) Filed: Sep. 13, 2005

(51) Int. Cl.
*H04N 7/14* (2006.01)
*G06F 17/30* (2006.01)

(52) U.S. Cl. .............. 348/14.01; 379/265.2; 379/265.1; 379/88.02

(58) Field of Classification Search ... 348/14.01–14.16; 709/204, 205, 256; 379/265.02, 88.02, 265.01; 705/10
See application file for complete search history.

(56) References Cited

U.S. PATENT DOCUMENTS

| 5,781,650 A | * | 7/1998 | Lobo et al. ................. 382/118 |
| 6,129,274 A | * | 10/2000 | Suzuki ....................... 235/381 |
| 6,978,006 B1 | * | 12/2005 | Polcyn .................... 379/265.12 |
| 7,319,779 B1 | * | 1/2008 | Mummareddy et al. ..... 382/118 |
| 2002/0046030 A1 | * | 4/2002 | Haritsa et al. ............... 704/256 |

* cited by examiner

*Primary Examiner*—Melur Ramakrishnaiah
(74) *Attorney, Agent, or Firm*—John C. Moran

(57) ABSTRACT

A method and apparatus route telecommunication calls in a telecommunication switching system by receiving visual information for a caller of one of the telecommunication calls; analyzing the received visual information for characteristics of the telecommunication calls; and routing the one of the telecommunication calls based on the analyzed visual information.

14 Claims, 4 Drawing Sheets

APPARATUS AND METHOD FOR ROUTING TELECOMMUNICATION CALLS USING VISUAL CALLER INFORMATION

TECHNICAL FIELD

This invention relates to the routing of telecommunication calls.

BACKGROUND

In the prior art, customer relation management systems (also referred to as call centers or automatic call distribution systems) receive incoming calls and route these calls to agents attached to the customer resource management system so that the agents can assist customers. Within the prior art, it is known for CRM systems to be quite large and have hundreds of agents that are connected to the CRM system. A CRM system may service a plurality of corporations with sets of agents being assigned to each corporation. This allows the agents to have experience with the needs of the customers of a particular corporation. In addition, it is known to have certain agents who are considered experts on a particular subject, and the less skilled agents can transfer customers to the more skilled agents for additional information.

SUMMARY

A method and apparatus route telecommunication calls in a telecommunication switching system by receiving visual information for a caller of one of the telecommunication calls; analyzing the received visual information for characteristics of the caller; and routing the one of the telecommunication calls based on the analyzed visual information.

DETAILED DESCRIPTION

One embodiment is responsive to an incoming video call to a customer relations management (CRM) system to extract the visual characteristics of a caller and to utilize the extracted characteristics to route the call to the proper agent. The characteristics of the caller may be demographic or personal preference information of the caller. The demographic information may include, but is not limited to, presence of facial hair, age, sex, body size, visual aids such as eye glasses, national origin, etc. The personal preference may include, but is not limited to, jewelry, clothing, hair style, hair coloring, body piercings, etc. For example, in a CRM system providing service for an Internet clothing site, the dress style and age could be utilized to route trendy teenagers to younger agents, and older, more sophisticated dressers could be routed to more professional agents. Similarly, body size, such as slim, athletic, fat, etc. could be utilized by a CRM system servicing a clothing Internet site to route a caller to the proper agent or to inform the agent ahead of time to the body size of the caller. Indeed, in such a CRM system, certain agents would always handle a certain type of body size.

Figure 1:
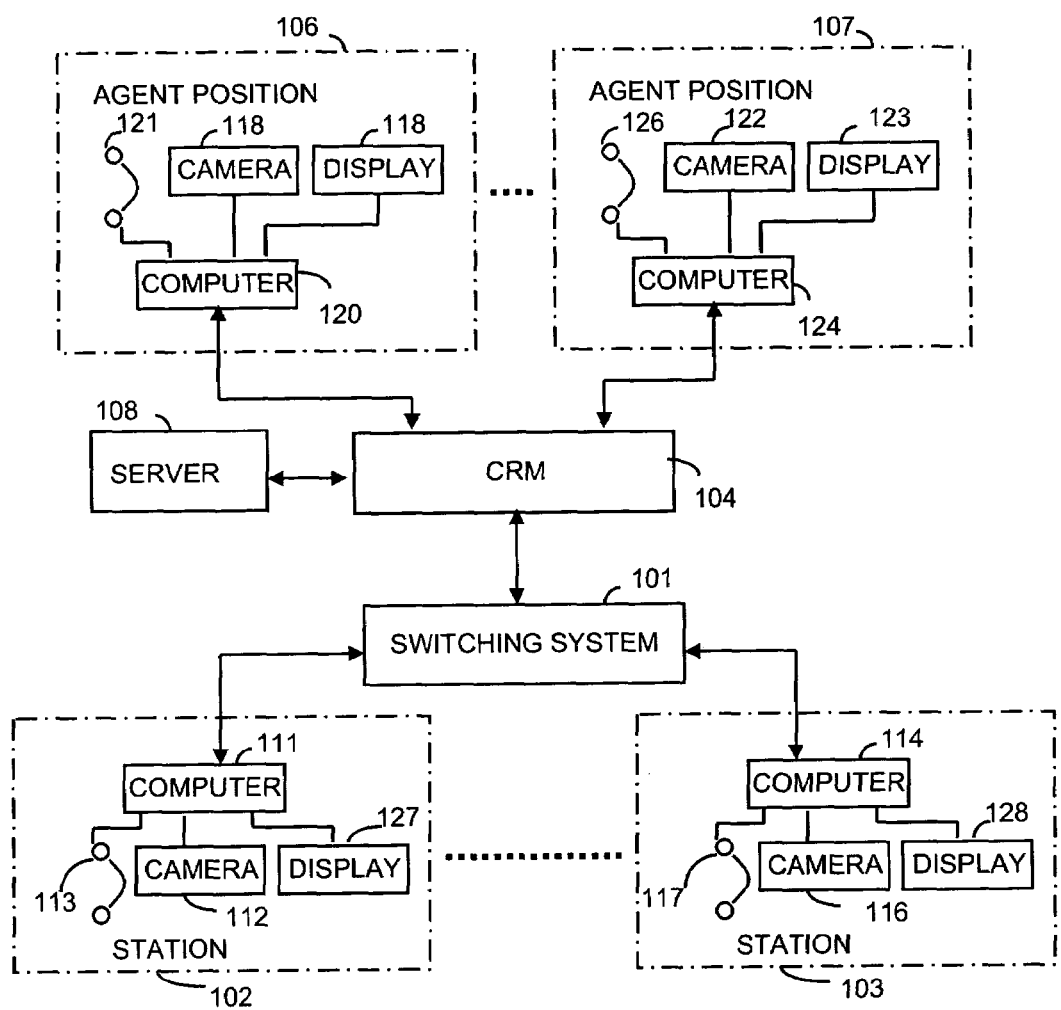
FIG. 1 illustrates an embodiment of a system.

FIG. 1 illustrates an embodiment of a system for the extraction and utilization of visual characteristics concerning a caller to CRM system 104. Video information is obtained from the caller utilizing a video camera such as camera 112 at station 102. The video information is then transmitted along with the call via switching system 101 to CRM system 104. The demographic and/or personal preference information can be extracted by either CRM system 104 or server 108. After the demographic and/or personal preference information is extracted, CRM system 104 utilizes this information to route the call to one of the agent positions 106-107. The agent at the selected agent position then assists the caller who is utilizing station 102.

Figure 2:
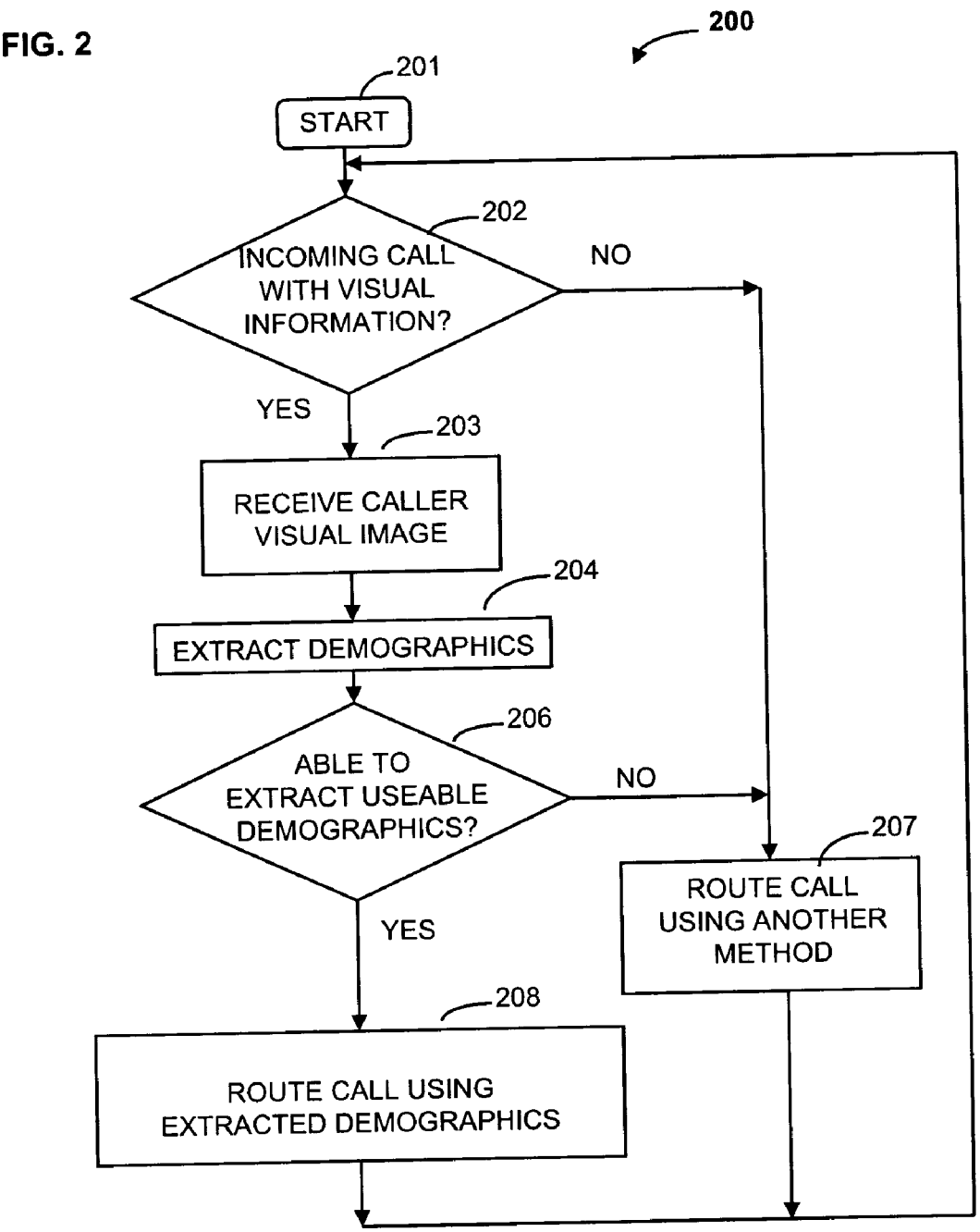
FIG. 2 illustrates an embodiment of system operations.

FIG. 2 illustrates an embodiment of a process for extracting and utilizing visual demographic and/or personal preference information for routing incoming calls to a CRM system. After being started in block 201, decision block 202 determines if the incoming call has visual information. If the answer is no, control is transferred to block 207, and the call is routed using another method before returning control back to decision block 202.

If the answer is yes in decision block 202, block 203 receives the caller visual information, and block 204 attempts to extract the demographics and/or personal preference from the visual image for the caller. Note, that the visual image may be video or a single visual image.

After execution of block 204, decision block 206 determines if usable demographics and/or personal preference information was extracted. If the answer is no, control is transferred to block 207. If the answer is yes, control is transferred to block 208 which routes the call utilizing the extracted demographic and/or personal preference information before returning control back to decision block 202.

Figure 3:
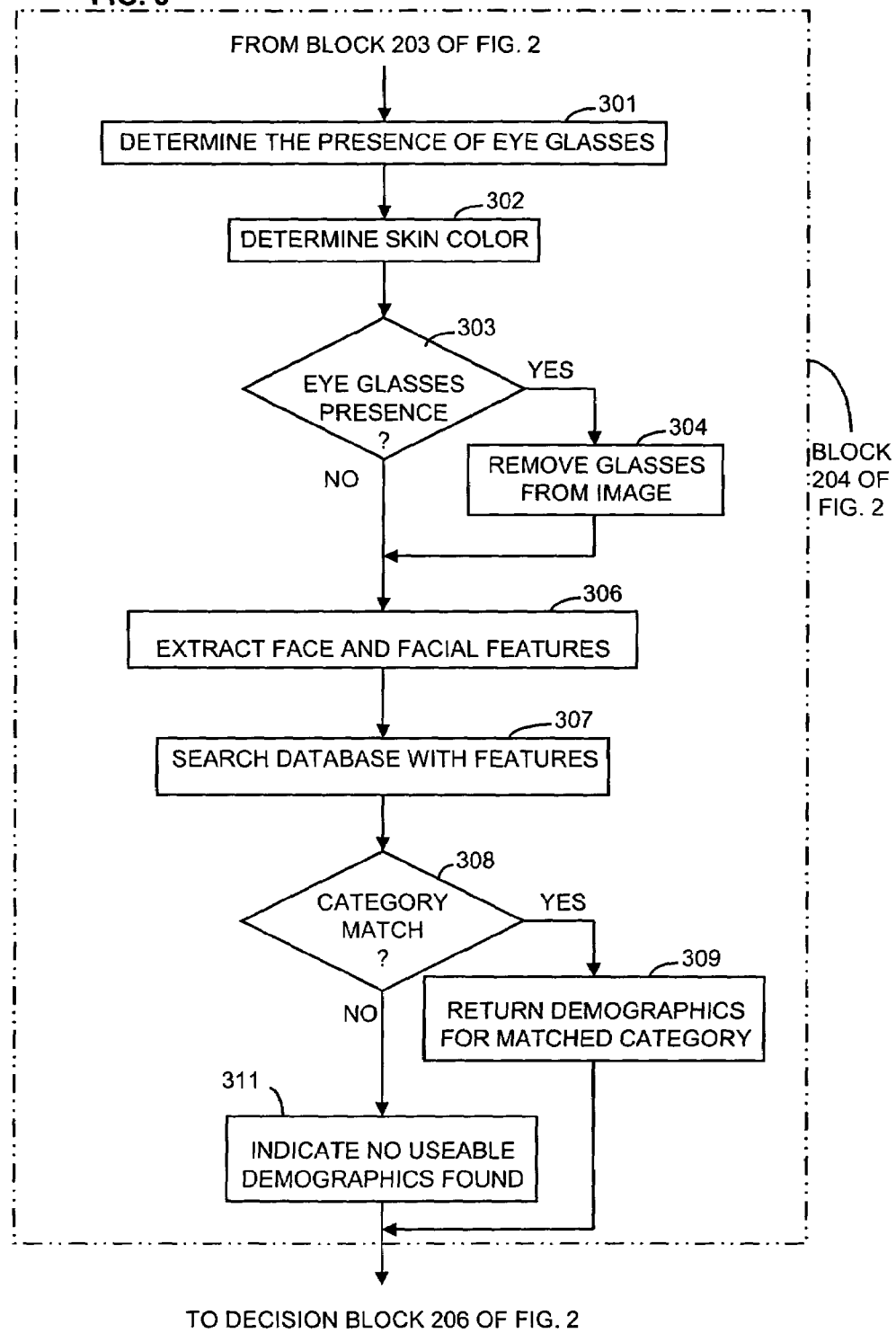
FIG. 3 illustrates an embodiment of demographics operation.

FIG. 3 illustrates in great detail operation of block 204 of FIG. 2. Block 301 determines the presence of eye glasses so that this information can be used to remove the eye glasses in block 304 and to be returned as part of the demographics information.

After execution of block 302, decision block 303 determines if eye glasses are present in the image. If the answer is yes, block 304 removes the eye glasses from the image before transfer control to block 306. If the answer is no in decision block 303, control is transferred to block 306. The detection and removal of eye glasses from an image is well known. See for example: "Automatic Eyeglasses Removal from Face Images", AccV2002: The 5$^{th}$ Asian Conference on Computer Vision, 23-25 Jan. 2002, Melbourne, Australia.

Block 306 extracts face and facial features from the image, and block 307 uses this information to search a database of faces that are arranged by demographic categories using rule-based automaton techniques. Block 307 determines the category that best fits the image if one exists before transfer control to decision block 308. Such techniques are well known in the see for example: U.S. Patent Application Publication 20050147292, U.S. Pat. No. 6,816,611, U.S. Pat. No. 6,804,684, U.S. Pat. No. 6,804,391, and U.S. Pat. No. 6,826,300.

Decision block 308 determines if a category match has been found. If the answer is yes, block 309 returns the demographics of the matched category to decision bock 206 of FIG. 2. If the answer is no, block 309 returns a no useable demographics indication to decision bock 206

Figure 4:
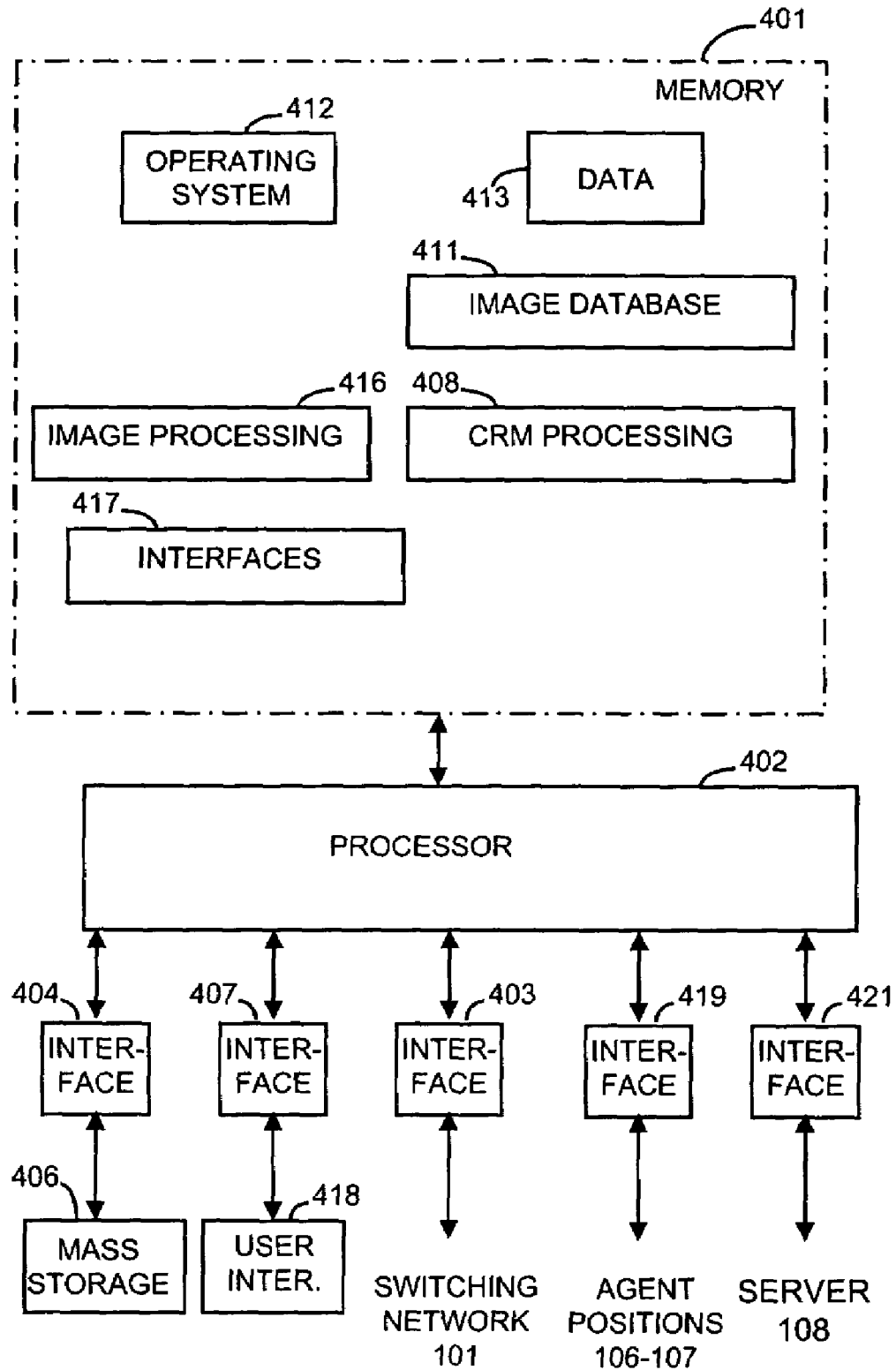
FIG. 4 illustrates an embodiment of customer resource management system.

FIG. 4 illustrates, in block diagram form, one embodiment of CRM 104. Processor 402 provides the overall control for the functions of CRM 104 by executing programs and storing and retrieving data from memory 401. Processor 402 connects to data network via interface 403. Processor 402 interfaces to user interface 418 via interface 407. Processor 402 interfaces to switching network 101 via interface 403. Processor 402 interfaces to agent positions 106-107 via interface 419. Processor 402 interfaces to server 108 via interface 421. Processor 402 performs the operations of CRM 104 by executing the routines illustrated in memory 401.

Operating system 412 provides the overall control and the necessary protocol operations. The communication and control of the various interfaces illustrated in FIG. 4 is provided by interfaces routine 417. CRM processing 408 provides overall control of CRM 104. Imaging processing 416 provides image processing operations with images being stored in database 411.

When the operations of the stations, servers, or systems are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The software can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where the stations, servers, or systems is implemented in hardware, the stations, servers, or systems can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed:

1. A method for routing telecommunication calls in a telecommunication switching system, comprising:
   receiving visual information for a caller of one of the telecommunication calls;
   analyzing the received visual information for body size, visual aids, or facial hair; and
   routing the one of the telecommunication calls based on the analyzed visual information.

2. An apparatus for implementing the method of claim 1.

3. A method for routing telecommunication calls in a telecommunication switching system, comprising:
   receiving visual information for a caller of one of the telecommunication calls;
   analyzing the received visual information for personal preferences wherein the personal preferences are at least one of jewelry, clothing, hair style, hair coloring, or body piercings; and
   routing the one of the telecommunication calls based on the analyzed visual information.

4. The method of claim 3 wherein the analyzing comprises extracting the characteristics of the caller; and
   determining the characteristics of the caller from the extracted characteristics of the caller.

5. An apparatus for implementing the method of claim 4.

6. The method of claim 3 wherein the telecommunication switching system is a customer relations management system.

7. The method of claim 6 wherein in the routing comprises selecting one of a plurality of agents of the customer relations management system to receive the routed one of the telecommunication calls.

8. An apparatus for implementing the method of claim 7.

9. An apparatus for implementing the method of claim 3.

10. A processor-readable medium for routing telecommunication calls in a telecommunication switching system, comprising processor-executable instructions configured for:
    receiving visual information for a caller of one of the telecommunication calls;
    analyzing the received visual information for body size, visual aids, or facial hair of the caller; and
    routing the one of the telecommunication calls based on the analyzed visual information.

11. A processor-readable medium for routing telecommunication calls in a telecommunication switching system, comprising processor-executable instructions configured for:
    receiving visual information for a caller of one of the telecommunication calls;
    analyzing the received visual information for personal preferences of the caller wherein the personal preferences are at least one of jewelry, clothing, hair style, hair coloring, or body piercings; and
    routing the one of the telecommunication calls based on the analyzed visual information.

12. The processor-readable medium of claim 11 wherein the processor-executable instructions for analyzing comprise processor-executable instructions for extracting the characteristics of the caller; and
    determining the characteristics of the caller from the extracted characteristics of the caller.

13. The processor-readable medium of claim 11 wherein the telecommunication switching system is a customer relations management system.

14. The processor-readable medium of claim 13 wherein in the routing comprises selecting one of a plurality of agents of the customer relations management system to receive the routed one of the telecommunication calls.

* * * * *